United States Patent
Shepherd et al.

(10) Patent No.: US 9,094,304 B2
(45) Date of Patent: Jul. 28, 2015

(54) SYSTEMS AND METHODS FOR DYNAMICALLY CONFIGURING COMMUNICATION DATA ITEMS

(75) Inventors: Paul Shepherd, Wauwatosa, WI (US); Dale Peterson, Waukesha, WI (US)

(73) Assignee: Cognex Corporation, Natick, MA (US)

( * ) Notice: Subject to any disclaimer, the term of this patent is extended or adjusted under 35 U.S.C. 154(b) by 117 days.

(21) Appl. No.: 13/468,653

(22) Filed: May 10, 2012

(65) Prior Publication Data

US 2013/0304882 A1   Nov. 14, 2013

(51) Int. Cl.
G06F 15/177 (2006.01)
H04L 12/24 (2006.01)
H04L 29/06 (2006.01)
G06F 12/00 (2006.01)

(52) U.S. Cl.
CPC ............ *H04L 41/0816* (2013.01); *H04L 29/06* (2013.01)
USPC .......................................... 709/220; 709/221

(58) Field of Classification Search
CPC ..................... H04L 63/0428; H04L 29/08261; H04L 29/08738; H04L 29/08801; H04L 63/0227; H04L 2029/06054; H04L 29/06; H04L 29/0604; H04L 29/06068; H04L 29/08009; H04L 29/08072; H04L 29/0809; H04L 29/08144
USPC .......... 709/217–218, 220–221, 223–229, 250
See application file for complete search history.

(56) References Cited

U.S. PATENT DOCUMENTS

| | | | |
|---|---|---|---|
| 4,559,614 A | 12/1985 | Peek et al. | |
| 5,557,798 A | 9/1996 | Skeen et al. | |
| 5,566,332 A | 10/1996 | Adair et al. | |
| 6,151,608 A | 11/2000 | Abrams | |
| 6,728,722 B1 | 4/2004 | Shaylor | |
| 6,741,608 B1 | 5/2004 | Bouis et al. | |
| 7,046,691 B1 | 5/2006 | Kadyk et al. | |
| 7,073,179 B2 | 7/2006 | Miller et al. | |
| 7,194,569 B1 | 3/2007 | Shaylor | |

(Continued)

FOREIGN PATENT DOCUMENTS

| | | |
|---|---|---|
| CN | 101123471 | 2/2008 |
| JP | 11-376953 A | 7/2001 |
| JP | 2002099561 | 5/2002 |

OTHER PUBLICATIONS

"OPC Architecture." Figure. Accessed Apr. 5, 2012. http://www.opcfoundation.org/01_about/April19_OPC-DISPLAY%20LAYOUT.pdf.

*Primary Examiner* — Zarni Maung
(74) *Attorney, Agent, or Firm* — Quarles & Brady LLP

(57) ABSTRACT

Systems and methods reconfigure data transmitted on a network, the network using a communication protocol. The systems and methods include a processor that is operable to receive data from a second device on the network; a memory medium; and a data configurator operable to dynamically reconfigure the data from the second device, with the data from the second device being in the form of a network item defined by the second device. The data configurator is operable to pass the reconfigured data to the processor and/or the memory medium in the form of a device item that is native to the device. A data design tool generates a map configuration to define a unique relationship between the network item and the device item. The map configuration includes a network representation portion for data in the network item and a device representation portion for data in the data item.

11 Claims, 8 Drawing Sheets

(56) References Cited

U.S. PATENT DOCUMENTS

| | | | |
|---|---|---|---|
| 7,890,568 B2* | 2/2011 | Belenki | 709/200 |
| 8,103,704 B2 | 1/2012 | Abrams | |
| 8,112,612 B2 | 2/2012 | Doerr et al. | |
| 2006/0277180 A1 | 12/2006 | Okamoto | |
| 2008/0271055 A1 | 10/2008 | Fink et al. | |
| 2011/0007665 A1* | 1/2011 | Dinur | 370/254 |
| 2011/0047258 A1* | 2/2011 | Griswold et al. | 709/223 |
| 2011/0113234 A1* | 5/2011 | Augenstein et al. | 713/150 |
| 2011/0191389 A1 | 8/2011 | Okamoto | |
| 2011/0282889 A1 | 11/2011 | Gerstberger et al. | |
| 2013/0159447 A1* | 6/2013 | Wei et al. | 709/208 |

* cited by examiner

SYSTEMS AND METHODS FOR DYNAMICALLY CONFIGURING COMMUNICATION DATA ITEMS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to data items, and more specifically, to configuring communication data items.

A communication protocol can be described as a system of digital message formats and rules. The protocol is used for exchanging digital messages between devices on a network that are capable of transmitting and/or receiving the particular message format. These messages are sent and received by devices on the network to establish communications and transfer data between the devices. The communication protocol specifies the rules governing this transmission of the messages, including the transmission of data items. As such, a class of communication protocols exists that are designed to transport predefined data items between two or more devices on the network. A device manufacturer or vendor utilizing such a protocol typically configures the device software and/or firmware responsible for the data items to generate a fixed form of data items so the vendor's device is able to transmit and receive communications in a configuration that is most efficient for the device and within the bounds of the communication protocol rules.

However, some customers that have devices on the network that interface, i.e., communicate, with the vendor's device may prefer to utilize a form of data items that is different from the preconfigured and fixed data items utilized by the device vendor. Accordingly, the customer may request that the vendor's device support a modified or completely different data item form to facilitate improving the communication efficiency, maintain compatibility with legacy devices, or compatibility with competitors devices. In order to accommodate a customer that is requesting such a change to the device vendor's preconfigured and fixed data item form, the device vendor most often must perform exclusive changes to the software and/or firmware of the vendor's device. Software/firmware changes are expensive, time consuming, and difficult to manage, as they are specific to the customer's request, and are rarely transferable to be used by other customers. Most vendors are reluctant to make these unique changes for a single customer because of these reasons.

Areas where communication protocols are used extensively are in the fields of manufacturing and automation. For example, some well known protocols used for communication between devices are EtherNet/IP, Profinet, CIP, and ModbusTCP, among others. A manufacturing/automation network can also include a wide variety of devices, including computers, robots, machines, and sensors, and there are countless others.

One exemplary technical field that may use a communication protocol for communications and the transfer of data is the field of machine vision or image processing analysis. In its simplest form, machine vision is typically used to inspect and/or locate an object. For example, in manufacturing applications, machine vision analysis may be used to detect defects in a manufactured object by acquiring images of the object and using various types of image processing algorithms to analyze the images. As an example, a system to manufacture electrical components such as resistors may use machine vision to examine the resistor in order to detect manufacturing defects, and ensure that the resistor is marked or color coded properly. A large amount of data can be collected and analyzed during the machine vision process. Not only must some or all of this data be communicated to other devices, instructions and other application related data can also be communicated to and from the machine vision system.

There are data conversion packages and industrial gateway devices available that allow a user to convert data from one device that operates using a first data format to another device that operates using a data format different than the first. These systems are mainly available in the field of information processing systems or database systems, and are mainly for the purpose of converting data one time from one system to another. However, these systems do not address the problem of reconfiguring communicated data items defined by the device vendor.

There are other system specifications that focus more on manufacturing and automation applications, such as OLE for Process Control (OPC) and Common Industrial Protocol (CIP). OPC provides an open standard specification for data communication and data access. The OPC specification does allow dynamic selection of what data items a user would like to transfer, but the OPC specification does not provide a means to dynamically alter the format or value of a data item. Similarly, the CIP includes a specification for dynamic assemblies, but, similar to OPC, this does not allow for data type or value conversion, such as bit field to integer or value inversion, for example.

What is needed are systems and methods that allow the dynamic configuration of data content and format, while maintaining independence from the underlying communication protocol.

BRIEF SUMMARY OF THE INVENTION

The present embodiments overcomes the disadvantages of the prior art by providing systems and methods for dynamically configuring the content and/or format of data items transmitted on a network, while maintaining independence from the underlying communication protocol, yet adhering to the protocol rules governing the transmission of data. The communication protocol defines how the data items are transmitted on the network, while the vendor defines the data content and format.

Accordingly, some embodiments comprise systems and methods for reconfiguring data transmitted on a network, the network using a communication protocol. The systems and methods include a processor and a memory medium. The processor is operable to receive data from a second device on the network. The systems and methods include a data configurator operable to dynamically reconfigure the data from the second device, with the data from the second device being in the form of a network item defined by the second device. The data configurator is operable to pass the reconfigured data to at least one of the processor and the memory medium in the form of a device item that is native to the device. The data configurator uses a map record, the map record defining a unique relationship between the network item and the device item. The map record includes a network representation portion for data in the network item and a device representation portion for data in the data item.

The systems and methods include a data design tool operable to provide the user the means to define the relationship between a network item and one or more device items. The data design tool generates and stores the user selected configuration information, which may be consumed at runtime by the data configurator to construct the map records.

Consistent with the above, some embodiments include a method for reconfiguring communication data from a first device on a network and providing the reconfigured data to a second device on the network. The method includes initiating a data configurator, the data configurator operable on the second device; receiving configuration information for reconfiguring a selected data item according to a configuration mode; generating a map record for the selected data item; starting runtime operation of the second device; at runtime, the data configurator receiving a transmitted network item including the selected data item; reconfiguring the selected data item from the transmitted network item according to the map record; and passing the reconfigured selected data item to an application on the second device.

Other embodiments include a method for reconfiguring data items using a data configurator. The method includes initiating a data design tool, the data design tool being located in memory on a first device coupled to a network, the first device including a user interface; selecting a data item for reconfiguring from a second device coupled to the network; generating a map configuration, the map configuration including a network representation portion and a device representation portion; saving the map configuration; passing the map configuration to a third device on the network, the third device including the data configurator; and using the data configurator, dynamically reconfiguring the selected data item from the second device according to the map configuration.

To the accomplishment of the foregoing and related ends, embodiments of the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

Figure 1:
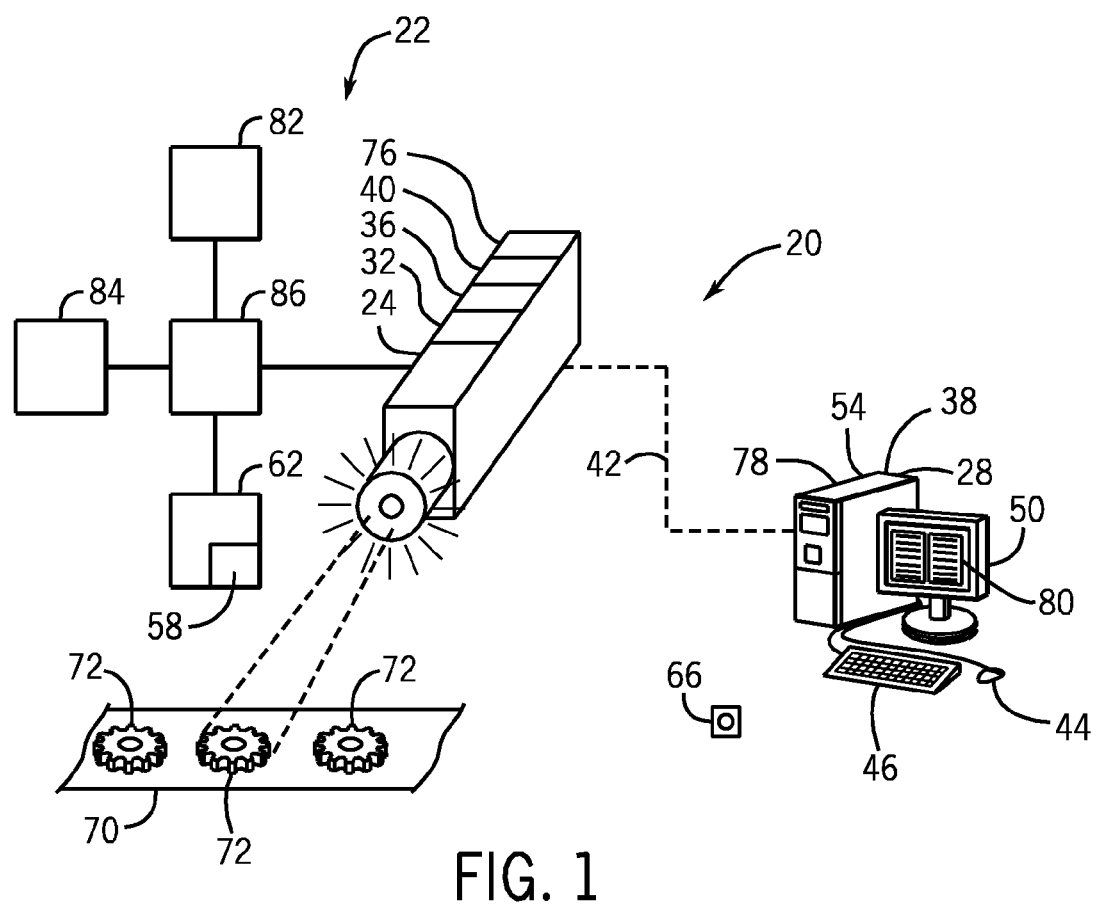
FIG. 1 is a schematic view of a system including devices on a network, a data design tool, and a data configurator adapted to reorganize data items in accordance with the present embodiments.
Figure 2:
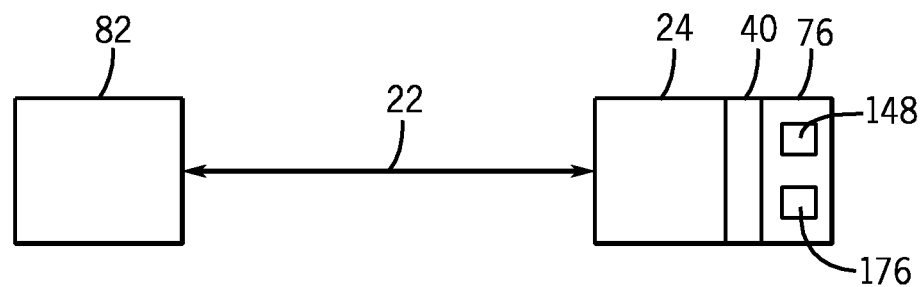
FIG. 2 is a block diagram view of the data configurator located on one device, the device in communication with another device across a network.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

The various aspects of the subject invention are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a processor-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers or processors.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to these configurations without departing from the scope or spirit of the claimed subject matter.

Embodiments of the invention are described below by using diagrams to illustrate either the structure or processing of embodiments used to implement the systems and methods of the present invention. Using the diagrams in this manner to present embodiments of the invention should not be construed as limiting of its scope. The present invention contemplates both methods and systems for dynamically configuring data items. The embodiments of the present invention may comprise a device, e.g., an automation device, a special purpose or general purpose computer including various computer hardware, software, and/or firmware, etc., as discussed in greater detail below.

The various embodiments of the invention will be described in connection with a machine vision system comprising one of a plurality of devices on a network. In some embodiments, the machine vision system includes a data configurator and a data design tool used to dynamically configure the content and format of a device item used by the machine vision system, while maintaining independence from, yet adhering to, the underlying communication protocol rules. That is because the features and advantages of the invention are well suited for this purpose. Still, it should be appreciated that the various aspects of the invention can be applied in other forms and in other devices capable of utilizing a communication protocol.

An exemplary machine vision system may use image processing software operable to perform any of various types of image analysis or image processing functions or algorithms in examining an acquired image of an object. Any type of camera or other device may be used to acquire the images to be analyzed in a machine vision application, including digital cameras, line scan cameras, infrared imaging devices, x-ray imaging devices, ultra-sonic imaging devices, and any other type of device which operates to receive, generate, process, or acquire an image or sensor data. As is known to one of skill in the art, the image acquisition, analysis, and/or processing functions described above includes the generation and transmission of data.

FIG. 1 illustrates an exemplary machine vision system 20 coupled to a network 22, such as a local area network (LAN), a wide area network (WAN), a wireless network, or the Internet, to which the teachings of this invention may be applied. The machine vision system 20 may be used in a manufacturing assembly, test, measurement, automation, and/or control application, among others, as non-limiting examples. It should be noted that, while the description references a machine vision system as the exemplary operative configuration, the teachings described and claimed herein are expressly applicable to a wide range of devices capable of communicating data items across a network using a communication protocol. Thus, the systems and methods described herein should be taken as broadly applicable to any system or device requiring communicating data items across a network using a communication protocol.

The machine vision system 20 includes an imaging device 24 coupled to a computer system 28. As used herein, the term "imaging device" is intended to include any of various types of devices that are operable to acquire and/or store an image and that may include on-board processing capabilities. An imaging device may thus be further operable to analyze or process the acquired or stored image. Examples of an imaging device include analog and digital cameras with on-board processors, and other similar types of devices.

Thus, FIG. 1 illustrates an exemplary image acquisition or machine vision system 20, where the imaging device 24 may include a processor 32, a memory medium 40, and a machine vision application 36 for performing an image processing function. The imaging device 24 may couple to the computer 28 through a serial bus, a network, wired or wireless, or through other means 42.

As used herein, the term "processor" may include one or more processors and memories and/or one or more programmable hardware elements. As used herein, the term "processor" is intended to include any of types of processors, CPUs, microcontrollers, or other devices capable of executing software instructions. As used herein, the term "programmable hardware element" is intended to include various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware.

The computer 28, or other such computing device, is shown coupled to the imaging device 24. The computer 28 is shown including a processor 38 and user interface components, such as, but not required, a mouse 44, keyboard 46 and display 50. Other types of computing devices and interfaces can also be employed, such as a Personal Digital Assistant (PDA), a laptop, a human machine interface, or a tablet device, in alternate embodiments. In some embodiments, the imaging device 24 can be coupled full-time to the computer 28, particularly where the computer performs one or more data configuration and/or image processing functions. Alternatively, the processor 32 in imaging device 24 typically allows for independent operation of the device 24 free of full-time coupling to a computer 28. In this embodiment, the computer 28 may be coupled to, and/or communicates with, the imaging device 24 and associated machine vision application 36 for device-setup, testing, and analysis of runtime operation, for example. The computer 28 may also operate with the imaging device 24 to analyze, measure or control other devices or processes. In other embodiments, the computer 28 may be omitted, i.e., the imaging device 24 may operate completely independent of the computer.

The computer 28 may include the processor 38 for executing computer programs and a memory medium 54 on which computer programs may be stored. In one embodiment, another memory medium 58 may be located on a second computer 62 that is coupled to the imaging device 24 or to the computer 28 through network 22. In this instance, the second computer 62 may operate to provide program instructions and/or data through the network 22 to the imaging device 24 or computer 28 for execution.

Referring still to FIG. 1, the imaging device 24 may also include memory medium 40 on which computer programs, e.g., text based or graphical programs, may be stored. In other embodiments, configuration information may be stored that may be used to configure a programmable hardware element, such as a field programmable gate array (FPGA), comprised in the imaging device 24 or the computer 28 to perform a measurement, control, automation, or analysis function, among others.

As used herein, the term "memory medium" includes a non-volatile medium, e.g., a magnetic media or hard disk, optical storage, or flash memory; a volatile medium, such as computer system memory, e.g., random access memory (RAM) such as DRAM, SRAM, EDO RAM, RAMBUS RAM, DR DRAM, etc.; or an installation medium, such as software media 66, e.g., a CD-ROM, or floppy disks, on which the computer programs may be stored and/or data communications may be buffered. The term "memory medium" may also include other types of memory or combinations thereof.

In the exemplary vision system 20 shown, a conveyor 70 may be used to move a plurality of objects 72. These objects pass, in turn, within a field of view (FOV) of the imaging device 24, so that their runtime images can be acquired and inspected, e.g., for flaws and/or other features of interest during an inspection process. As such, the imaging device 24 may acquire one or more images of an observed object 72.

In some embodiments, a data configurator 76 may reside and/or execute on the imaging device 24. The data configurator 76 may also be part of the machine vision application 36, and may be accessed using the computer 28. In other embodiments, the data configurator 76 may reside and/or execute on the computer 28, or may include components that reside and/or execute on the imaging device 24 and on the computer 28.

In some embodiments, a data design tool 78 may reside and/or execute on the computer 28. In other embodiments, the data design tool 76 may be part of the machine vision application 36, and may reside and/or execute on the imaging device 24 and may be accessed using the computer 28. In other embodiments, the data design tool 76 may include components that reside and/or execute on the imaging device 24 and on the computer 28. The data design tool 78 may be operable to provide the user the means to define the relationship between a network item and one or more device items. The data design tool 78 may generate and store the user selected configuration information that may be consumed at runtime by the data configurator 76 to construct a map record (discussed below).

In the embodiment described, the data design tool 78 may be an offline tool that a user uses to enter and save some or all of the configuration information used by the data configurator to reconfigure data. In some embodiments, the data design tool 78 may be used for design and/or setup, and the data configurator may be an online, i.e. runtime, tool.

Embodiments of the data configurator 76 and the data design tool 78 described herein provide customizable reorganization of data including the ability to configure the layout, content, and value of communicated data without modification of the transmitting or receiving device's software and/or firmware. In essence, by using the data design tool 78 to define the relationship between a network item and one or more device items, the data configurator 76 is able to use the defined relationship to map data that is externally visible on the network 22 (described as a network item) to the data content and format that is native to a vendor's device (described as a device item), and, to map data content and format that is native to the vendor's device to data that is visible on the network 22. The user is no longer dependent on the form of the vendor's preprogrammed data format. The user can now define their own preferred data format and still interact with the vendor's device, without requiring the vendor to create custom software and/or firmware.

The network item that is being reconfigured need not be based on communication protocol rules, i.e. EtherNet/IP or Profinet rules, but rather is one or more predefined device items that are statically populated into a fixed structure and transmitted and/or received across a network 22. The device item is defined by the device vendor.

The communication protocol defines how the network items are transferred on the network, but the device vendor defines the data content and format. Therefore, in order to stay protocol independent, the device items are defined in a protocol independent fashion. The mapping from device items to network items can be dependent on the communication protocol, but generally the data items themselves are not protocol based in that they are not part of the protocol.

The data design tool 78 may include and/or interact with a user interface mechanism 80, e.g., a graphical user interface, or keyboard 46 and screen 50, to allow a user to create instructions for the data configurator 76 on what data is to be reorganized and how the data is to be reorganized, and without the need to implement unique firmware changes per individual customer's requests. As such, the user is able to provide configuration information to the data configurator 76 for generating one or more map records and/or logic elements, discussed in greater detail below, that are used to reorganize data according to their particular needs, and in turn, the data configurator 76 performs the data manipulation at runtime.

For example, the device vendor, in this exemplary embodiment the machine vision system 20 vendor, predefines one or more device items for the imaging device 24. A device item may comprise any number of data forms and/or types. For example, a device item may be a device command, device event, and/or device values. In one example, a piece of data (typically a single bit) may be used to indicate the occurrence of an event. In another example, the current speed of a motor may be considered value data.

In use, a user of any of the other devices 62, 82, and/or 84 coupled to a hub 86 on the network 22 (see FIG. 1) will then be able to instruct the data configurator 76 to reorganize data from the user's device 82 so the data ends up to be in the form of the vendor's predefined device items. The user's device 82, for example, generates data that can then be transmitted on the network 22 to the imaging device, i.e., vendor's device 24, where the data configurator 76 is able to reorganize the data from the user's device to be in the form of the vendor's predefined device items.

The data configurator 76 may be instructed to reorganize data in a variety of ways. In an exemplary embodiment, the data configurator may utilize any combination of three different configuration modes capable of reorganizing data, although other modes are within the scope of the invention. The exemplary configuration modes include data mapping 88, data type translation 90, and logical data manipulation 92. Each are described in further detail below.

Figure 3:
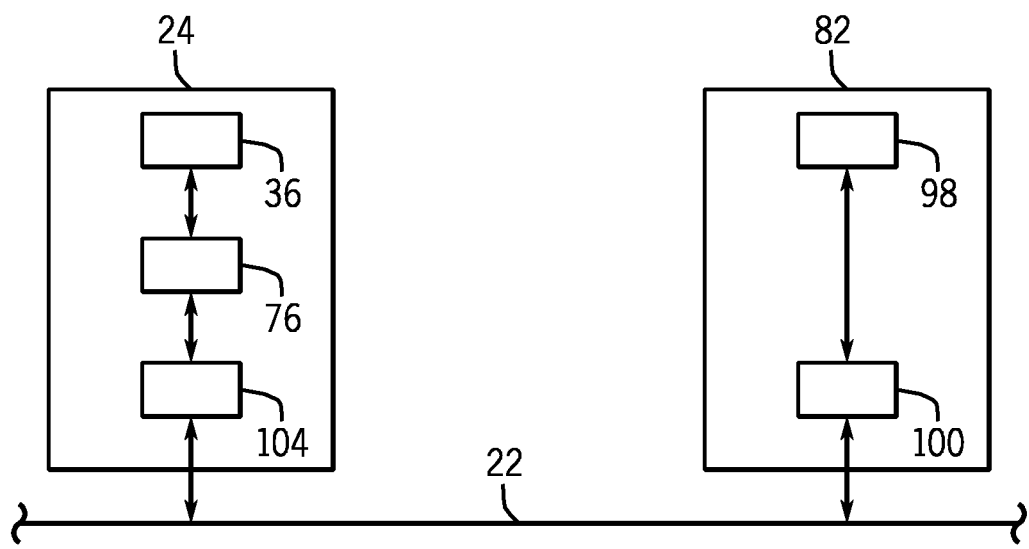
FIG. 3 is a block diagram view similar to FIG. 2, except showing further detail of the flow of data.

Referring to FIG. 3, a network item 98 is generated by a user's device 82 and then passed to the communication protocol 100 for transmission to the vendor's device 24 on the network 22. The network item 98 is received by the communication protocol 104 on the vendor's device 24. The protocol 104 then passes the network item to the data configurator 76. The data configurator 76 then reorganizes the network item into one or more device items using any of the configuration modes described below, and passes the device items to the machine vision application 36 on the vendor's device 24, e.g., to be consumed by the machine vision application 36. It is to be appreciated that the data configurator 76 is also capable of receiving device items from the machine vision application 36 on the vendor's device, reorganizing the device items into a network item, and passing the network item to the communication protocol 104 so the protocol can transmit the reorganized data across the network 22 to the user's device 82.

Figure 4:
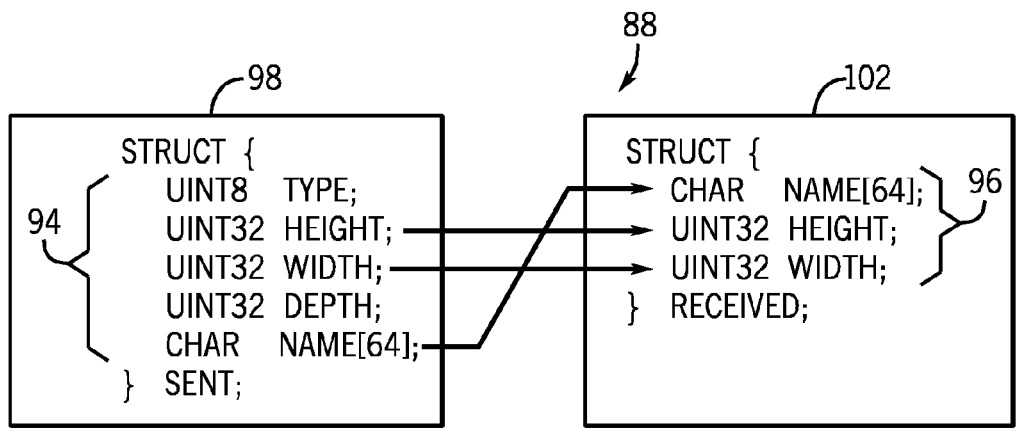
FIG. 4 is a block diagram view of a data mapping configuration mode available for data item reorganization, in accordance with the present embodiments.

In the following examples, a network item is an organization of individual data items as it is seen on the network 22. Referring now to FIG. 4, a simplified representation of data mapping is shown as the reorganization of a network item 98 into a device item 102. In this example, both the network item 98 and the device item 102 are in the form of a known data structure, but this is not a requirement, as FIGS. 5 and 6 show individual device items that are not in data structure form.

The network item 98 is shown to include five individual data items 94. Data items 94 may be reorganized transparently as part of the communications process. Using the data configurator 76 for data mapping, some or all of the content of network item 98 can be reorganized, i.e., mapped, into device item 102. As seen in the device item 102, the organization of transmitted individual data items 94 has been rearranged in device item 102, and the number of transmitted individual data items 94 has been reduced from five to three individual data items 96.

Figure 5:
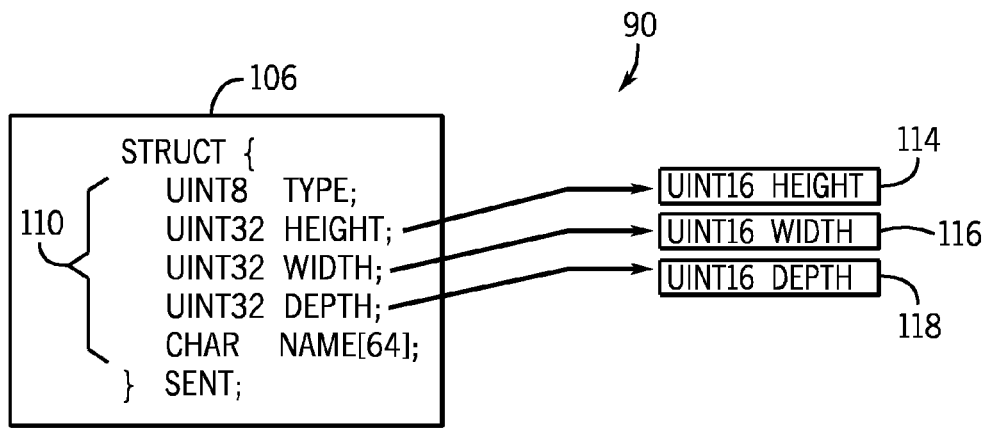
FIG. 5 is a block diagram view of a data type translation configuration mode available for data item reorganization, in accordance with the present embodiments.

Similarly, and as shown in FIG. 5, data type translation refers to translation of common data types. FIG. 5 shows a network item 106 including five individual data items 110. Any of these five individual data items 110 may be translated transparently as part of the communications process. FIG. 5 shows an example of data translation using the data configurator 76, where some or all of the content of transmitted network item 106 can be reorganized, i.e., translated, into a plurality of device items 114, 116, 118, where selected individual data items 110 have been translated into the individual device items 114, 116, 118. The individual data items 110 have been translated from 32 bit integer values to 16 bit integer values, and the number of transmitted individual data items 110 has been reduced from five data items to three device items 114, 116, 118.

Figure 6:
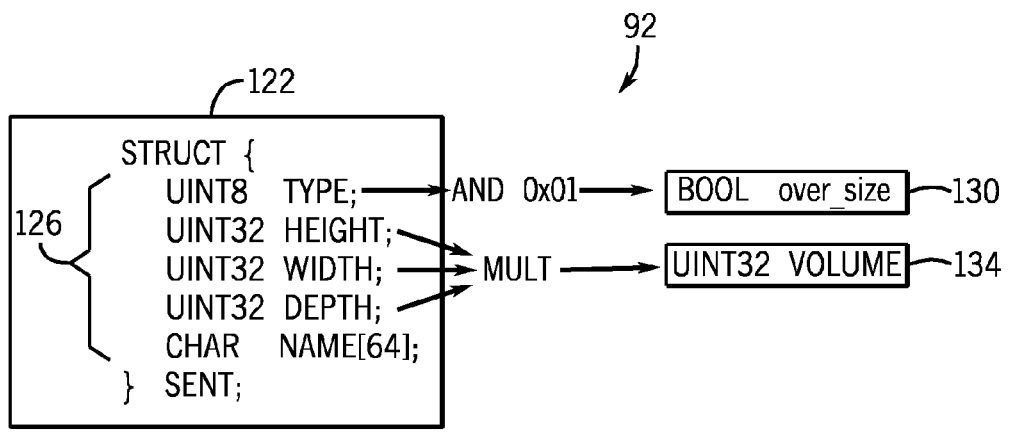
FIG. 6 is a block diagram view of a logical data manipulation configuration mode available for data item reorganization, in accordance with the present embodiments.

Referring now to FIG. 6, logical data manipulation refers to the altering of a data value based on any logical (AND, OR, XOR, NOT, etc) and/or arithmetic operators. FIG. 6 shows a network item 122 including five individual data items 126. Any of these five individual data items 126 may be manipulated transparently as part of the communications process. FIG. 6 shows an example of data manipulation using the data configurator 76, where some or all of the content of transmitted network item 122 can be reorganized, i.e., manipulated, into a plurality of device items 130, 134. As seen in device items 130, 134, transmitted individual data items 126 have been manipulated using both logical and arithmetic operators (although both are certainly not required). And, the number of transmitted individual data items 126 has been reduced from five individual data items to two device items 130, 134.

As can be seen, in addition to logical and/or arithmetic operators, logical data manipulation (or any of the configuration modes) also provides for data type conversion. For example, a bit field can be converted into an integer field, and vise versa. In addition, each of the configuration modes may be performed individually, or in any combination.

Both the mapping and logic functionality as described above may be independent of the nature and operation of the communications protocol being used. As such, it would not be tied to a specific type of connection or communications medium.

In order for the data configurator 76 to reorganize data as described above, the data configurator 76 dynamically constructs a unique map record 140. Information to construct the map record 140 may be provided by the data design tool 78. Each map record 140 defines the unique relationship between select data in a uniquely identified network item and an associated uniquely identified device item. At runtime, the data configurator 76 utilizes the constructed map record 140 to reorganize the user's transmitted network item. The protocol receives the network item and passes the network item to the data configurator 76 for reorganization.

Prior to starting the underlying communications protocol and going on-line, the vendor's device 24 typically executes initialization activity. The map record 140 may be dynamically constructed during this initialization activity. It is to be appreciated that the data configurator 76 is also capable of reorganizing data from the vendor's device 24 such that the data can be transmitted on the network 22 to the user's device 82. The map record 140 may be constructed in a generic way such that a variety of map records can be configured without a need to change device software and/or firmware.

Figure 7:
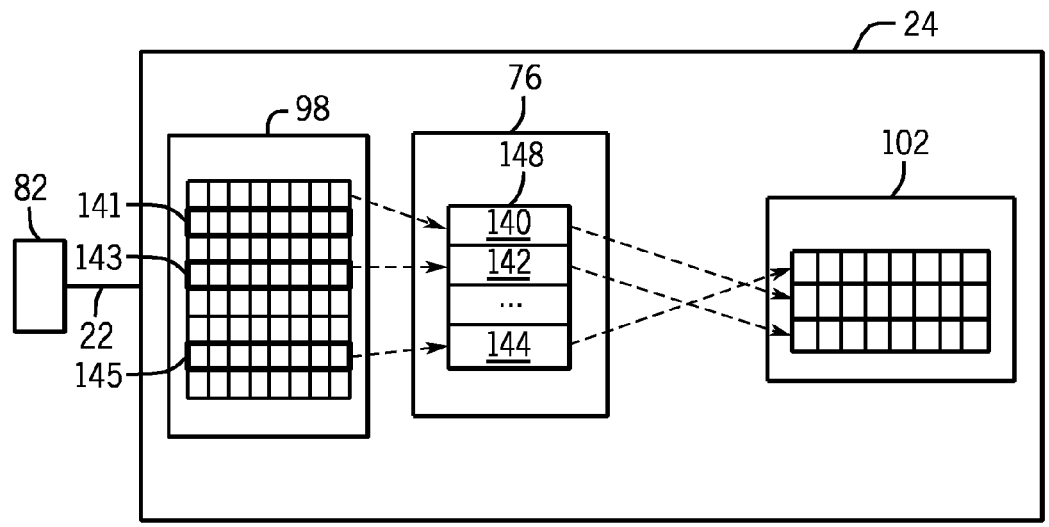
FIGS. 7 and 8 are block diagram views of a network item reconfiguration where a network item is reconfigured according to map records into individual device items and then transmitted to a user's device, in accordance with the present embodiments.
Figure 8:
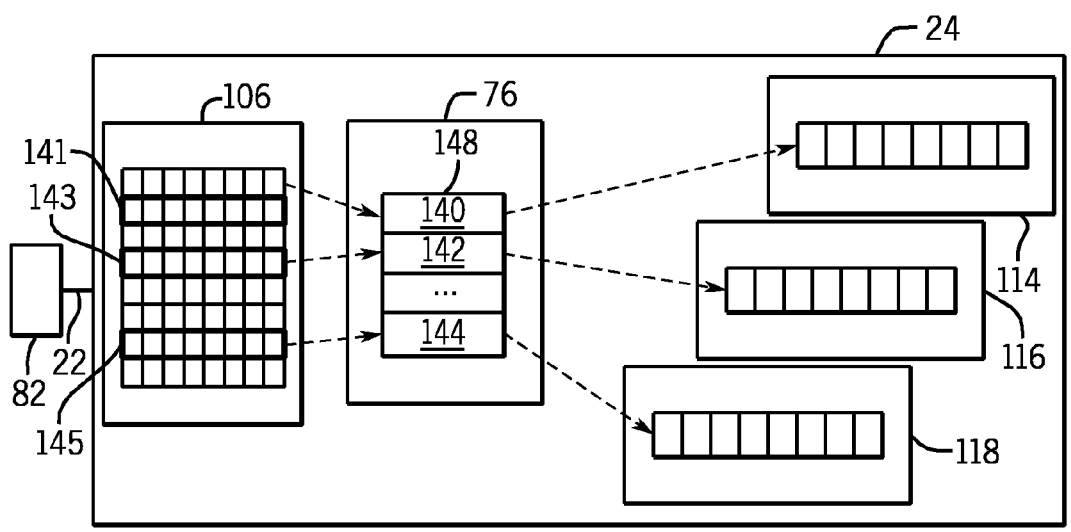
Figure 9:
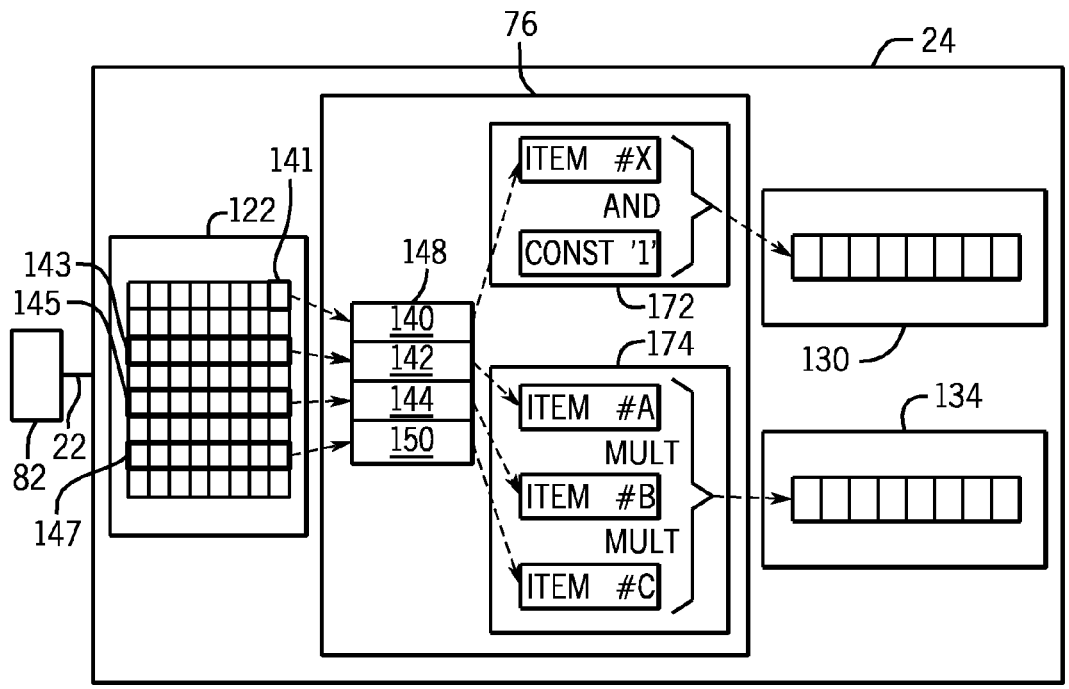
FIG. 9 is a block diagram view of a network item reconfiguration similar to FIGS. 7 and 8, except the network item is reconfigured according to map records and logic elements into individual device items, and then transmitted to a user's device, in accordance with the present embodiments.

FIGS. 7-9 show a more detailed representation of the reorganization of network items 98, 106, and 122 as shown in FIGS. 4-6, respectively. Referring to FIG. 7, network item 98 represents an organization of data as it has been received by the communication protocol on the vendor's device 24. Each network item on the network is assigned a unique identifier, e.g., from 1 to 1+n, for example. A map record is constructed for each individual data item in the network item 98 that requires reconfiguration. Any number of map records may be constructed, with three map records 140, 142, 144 being shown. The plurality of map records 140, 142, 144 are shown to form an exemplary map list 148. The map list 148 may contain any number of map records. As described above, each map record 140, 142, 144 defines the relationship between select data 141, 143, 145 respectively, in network item 98 and the associated device item 102 in the vendor's device 24. A device item can be a real data element in the vendor's device or a virtual data item, such as a logic element described below.

At runtime, the data configurator 76 utilizes one or more of the map records 140, 142, 144 from the map list 148 to manipulate the transmitted network item. For example, the transmitted network item 98 may be manipulated such that map record 140 manipulates data 141 so it may be passed to device item 102 in the vendor's device 24. Similarly, map record 142 manipulates data 143 so it may be passed to device item 102, and map record 144 manipulates data 145 so it may be passed to device item 102.

FIG. 8 shows a more detailed representation of the reorganization of network item 106 as shown in FIG. 5. Network item 106 represents an organization of data as it may be seen on the network 22. Again, each network item on the network is assigned a unique identifier. A map record is constructed for each individual data item in the network item 106 that requires reconfiguration. Any number of map records may be constructed, with three map records 140, 142, 144 being shown. The plurality of map records 140, 142, 144 are shown to form an exemplary map list 148. The map list 148 may contain any number of map records. As described above, each map record 140, 142, 144 defines the relationship between select data 141, 143, 145 respectively, in network item 106 and the associated device items 114, 116, 118 in the vendor's device 24.

At runtime, the data configurator 76 utilizes one or more of the map records 140, 142, 144 from the map list 148 to manipulate the transmitted network item. For example, the transmitted network item 106 may be manipulated such that map record 140 manipulates data 141 so it may be passed to device item 114 in the vendor's device 24. Similarly, map record 142 manipulates data 143 so it may be passed to device item 116, and map record 144 manipulates data 145 so it may be passed to device item 118.

FIG. 9 shows a more detailed representation of the reorganization of network item 122 as shown in FIG. 6. As previously discussed, the data configurator 76 also allows for the logical manipulation of data. For example, the data configurator 76 allows a user to combine multiple data items into a new data item or alter one data item's value based on the value of another data item.

Network item 122 represents an organization of data as it may be seen on the network 22. Each network item on the network is assigned a unique identifier. A map record is constructed for each individual data item in the network item 122 that requires reconfiguration. Any number of map records may be constructed, with four map records 140, 142, 144, 150 being shown. The plurality of map records 140, 142, 144, 150 are shown to form an exemplary map list 148. The map list 148 may contain any number of map records.

In addition, one or more logic elements 172, 174 may be dynamically constructed and are shown in addition to the map list 148. The logic elements 172, 174 may include any number of logic operations, with one operation AND being shown in logic element 172, and two MULT operations being shown in logic element 174. The logic elements are constructed in a generic way such that a variety of logical operations can be configured without need to change software or firmware. As described above, each map record 140, 142, 144, 150, along with the logic elements 172, 174 defines the relationship between select data 141, 143, 145, 147 respectively, in network item 122 and the associated device items 130, 134 in the vendor's device 24.

At runtime, the data configurator 76 utilizes the constructed logic elements 172, 174 in combination with the map records 140, 142, 144, 150 to manipulate the transmitted network item 122. For example, the transmitted network item 122 may be manipulated such that map record 140 and logic element 172 manipulates data 141 so it may be passed to device item 130 in the vendor's device 24. Similarly, map records 142, 144, 150 and logic element 174 manipulates data 143, 145, 147 so it may be passed to device item 134 in the vendor's device 24.

FIG. 9 also shows that a map record 140 can provide for the subdivision of larger data items 143, 145, 147 into smaller sub-items 134, or the reverse, small data items 141 into larger aggregate items 130.

Figure 10:
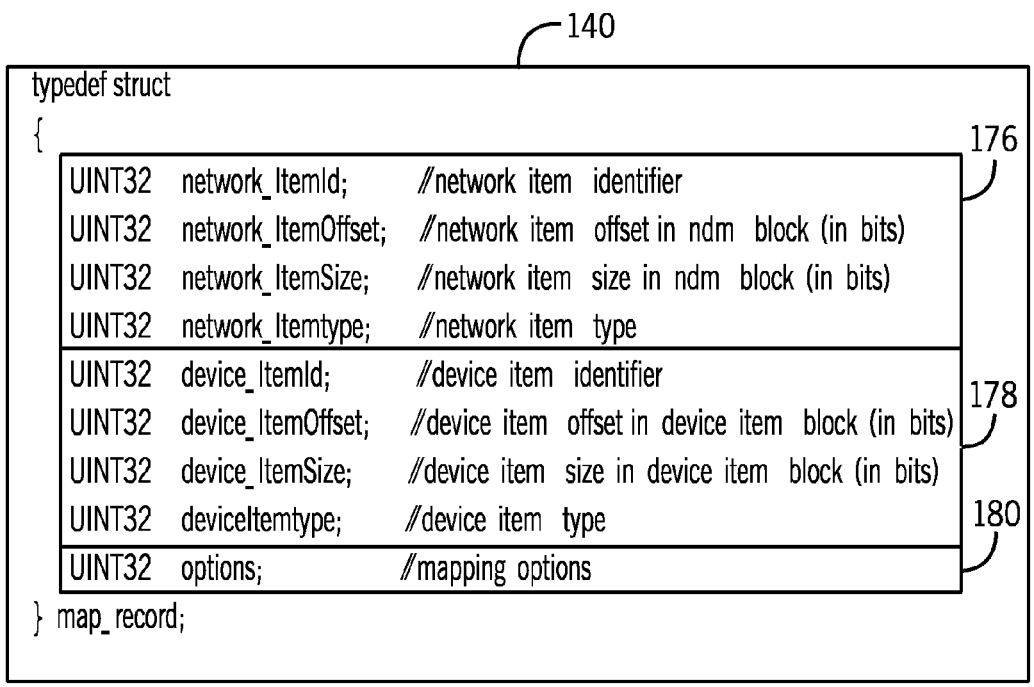
FIG. 10 is block diagram view of an exemplary map record, in accordance with the present embodiments.

Referring to FIG. 10, an exemplary map record 140 is shown. As described above, the map record 140 defines the unique mapping between the transmitted representation of data 141, for example, from network item 98, and the representation of a device item, e.g., device item 102 in the vendor's device 24. The map record includes a network representation portion 176, a device representation portion 178, and an options portion 180. An individual data item 141 represented in the map record 140 includes a variety of data fields, including for example, ID, offset, size, and type, for both the network representation portion 176 and the device representation portion 178. Item ID defines a unique item identifier, item offset defines an offset value in the network item 98, item size defines a size of the individual data item 141 in the network item 98, and item type defines one of any known common data types, such as bit, unsigned byte, signed long, etc., and a special link type identifying a map link for hierarchical maps (see FIG. 14 and discussion below). There may also be a variety of details identified as an options variable in the options portion 180, including, but not limited to, data flow direction, input/output, dummy data place holder—do not map, and invert data.

Figure 11:
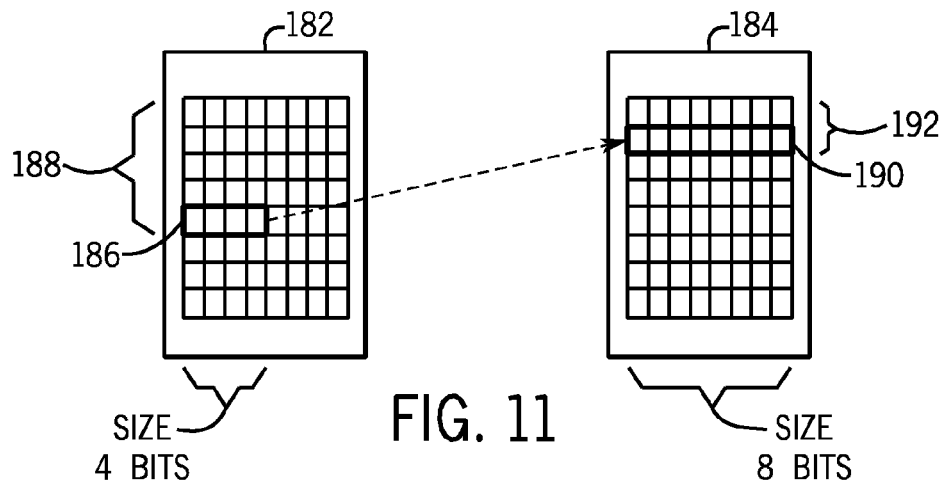
FIG. 11 is a block diagram view of an exemplary mapping from a network item to a device item.
Figure 12:
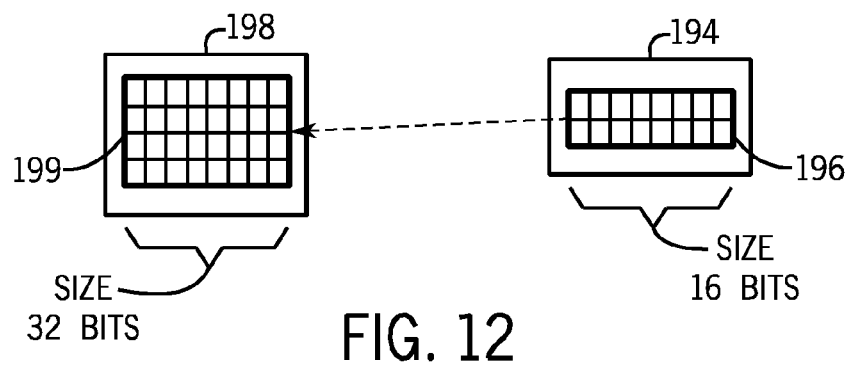
FIG. 12 is a block diagram view of an exemplary mapping from a device item to a network item.

By way of example, FIG. 11 shows a network representation and a device representation as defined by a map record 140 in the mapping from a network item 182 to a device item 184. In this example, a field of four unsigned bits 186 is mapped from bit offset thirty-two 188 of network item 182 into an unsigned byte 190 at bit offset eight 192 of device item 184. FIG. 12 shows an additional mapping example where the entire device item 194, which consists of a sixteen bit unsigned integer 196 from bit offset zero, is mapped to the entire network item 198 consisting of a thirty-two bit signed integer 199 at bit offset zero.

Figure 13:
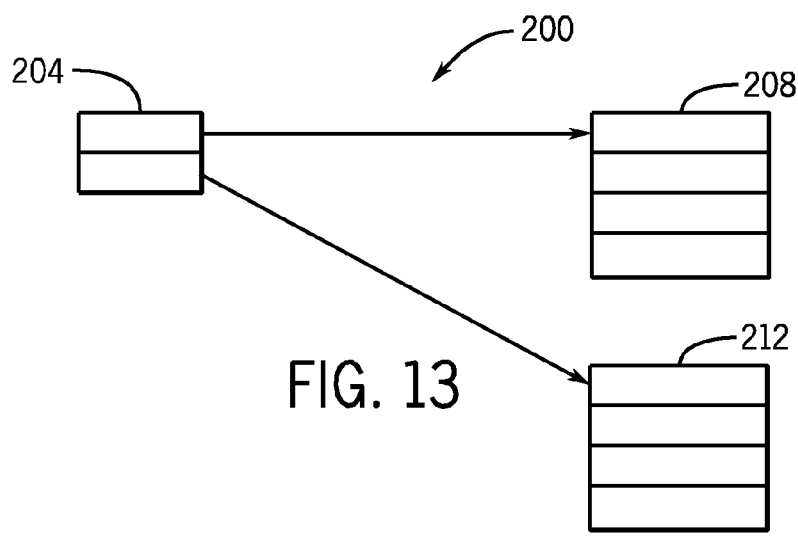
FIG. 13 is a block diagram view of a map list in the form of a hierarchical tree, the tree consisting of a tree of sub-lists, in accordance with the present embodiments.

As noted above, a map list can be organized as a hierarchical tree, flat list or combination of both forms, for example. The flat list configuration is a simple straight list of map records, such as map list 148 shown in FIG. 7. Referring to FIG. 13, a hierarchical tree consists of a tree of sub-lists. The exemplary hierarchical tree 200 consists of a root flat list 204 that groups an input sub list 208 and an output sub list 212 in separate tree branches. This type of configuration may be used to speed processing by eliminating the need to search every map record in a single flat list. The hierarchical tree form is more complex, but allows data to be organized in logical groupings. Such groupings can be defined for any desired application purpose, such as increasing processing speeds, for example.

Figure 14:
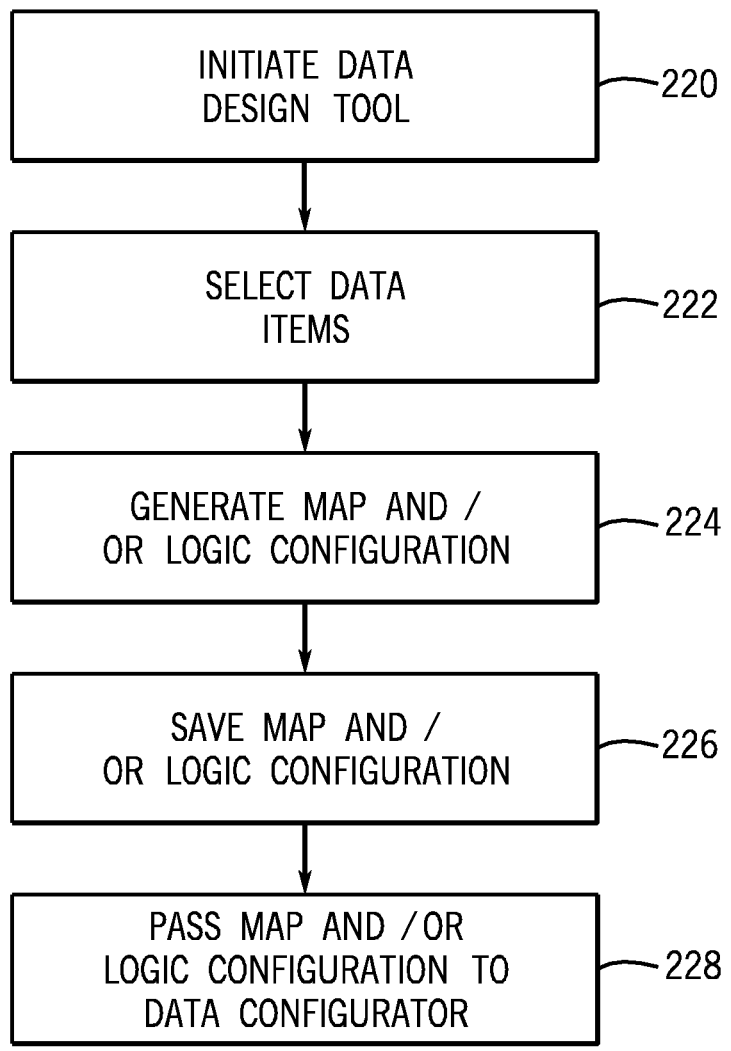
FIG. 14 is a flow chart of a method of use associated with the data design tool.
Figure 15:
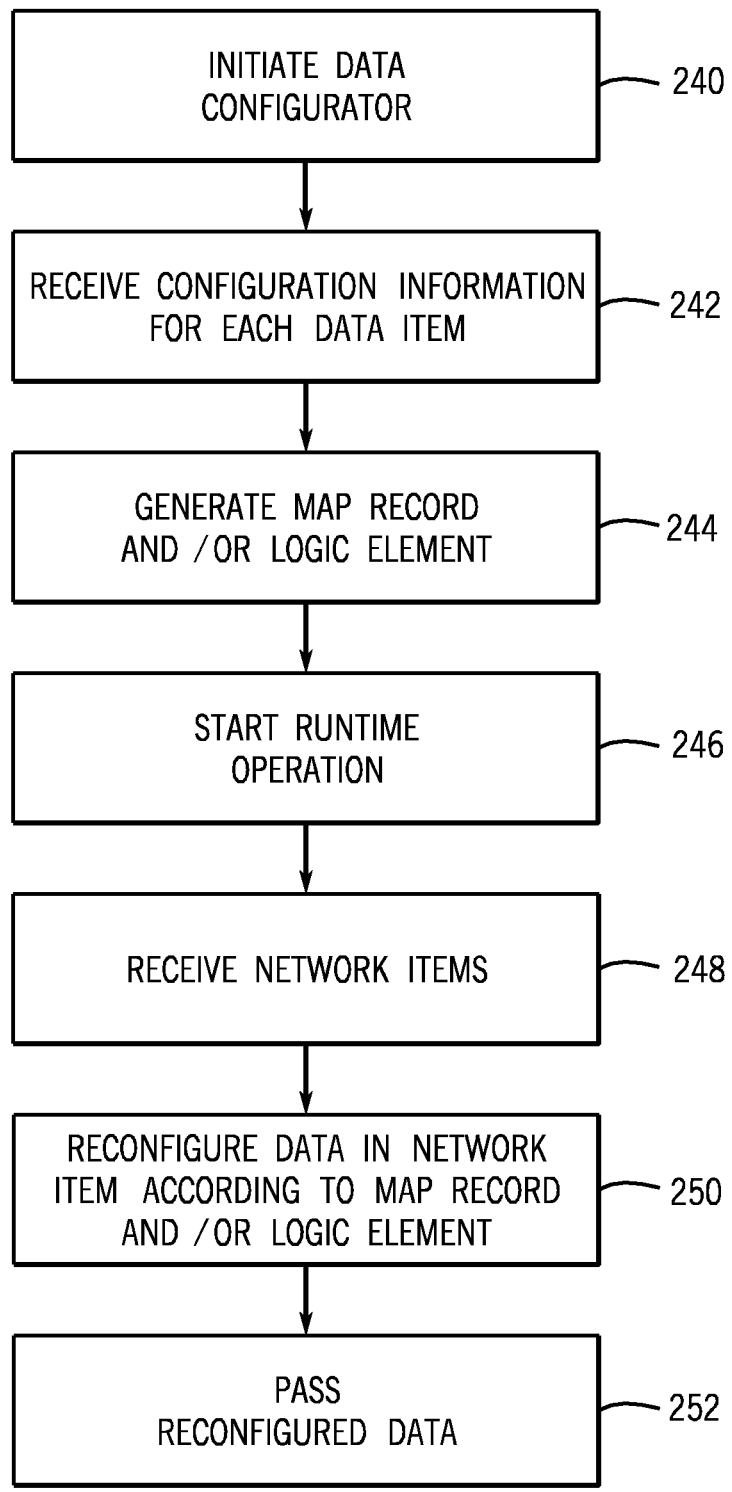
FIG. 15 is a flow chart of a method of use associated with the data configurator.

FIGS. 14 and 15 illustrate embodiments of methods of using the data configurator 76 and the data design tool 78 for manipulating data. The methods shown may be used in conjunction with any of the computer systems or devices shown in the above Figures, among others. In various embodiments, some of the method elements shown may be performed concurrently, in a different order than shown, or may be omitted. Additional method elements may also be performed as desired.

Referring to FIG. 14, a method is shown where a user uses the data design tool 78 to generate instructions for the data configurator 76 to prepare it for performing data conversion. A first step is to initiate the data design tool 78 as indicated at process block 220. The user may initiate the data design tool 78 using computer 28, or optionally directly through an interface on the vendor's device 24. As previously discussed, the data design tool 78 may be located in memory medium 40 in the device 24 and/or in memory medium 54 in the computer 28, and, accordingly, may be executed by the processor 32 on the device 24 and/or the processor 38 on the computer 28. Using the interface 80 displayed on screen 50, the user may select data items 141, 143, and/or 145, for example, as indicated at process block 222. The selection process may optionally include providing data information for the network representation portion 176, the device representation portion 178, and the options portion 180. The selected data items are assembled to generate the configuration information for the data configurator 76 to prepare it for performing data conversion using one or more map configurations, as indicated at process block 224. The user may also, optionally, generate one or more logic configurations 172. Either the data design tool 78 and/or the data configurator 76 may then generate a map list 148 including the assembled map configurations. The user may then save the map list, map configurations and/or logic configurations, as indicated at process block 226. Any of the map list 148, map configurations, and/or logic configurations may be passed to the data configurator, as indicated at process block 228.

Referring to FIG. 15, a method is shown describing steps undertaken by the data configurator 76. As indicated at process block 240, the data configurator 76 may be initiated using the data design tool 78. The data configurator 76 then may receive the map list 148, map configuration, and/or logic configuration information for reconfiguring the selected data items according to any of the available configuration modes, as indicated at process block 242. The map configurations and/or logic configurations may optionally include providing data information for the network representation portion 176, the device representation portion 178, and the options portion 180. Based on the configuration information, a map record 140 and/or a logic element 172 for each data item may be generated, as indicated at process block 244. Either the data design tool 78 and/or the data configurator 76 may generate the map record 140 and/or a logic element 172 for each data item. The device runtime operation may then be started, as indicated at process block 246. At runtime, as indicated at process block 248, the data configurator 76 receives from the communication protocol 104 the transmitted network item 98, and at process block 250, the data configurator 76 reconfigures the selected data items from the network item according to the map records and/or logic elements. The manipulated data is passed to the machine vision application 36 on the vendor's device 24, at process block 252, to be received by the vendor's device in one or more device items that have been reconfigured from the transferred network item.

Although the present invention has been described with reference to preferred embodiments, workers skilled in the art will recognize that changes may be made in form and detail without departing from the spirit and scope of the invention. For example, embodiments of the invention are not limited to the embodiments of vision systems and associated electronics shown herein and may be practiced with numerous other devices capable of transmitting and/or receiving data on a network.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A device for reconfiguring data transmitted on a manufacturing and/or automation network, the network using a communication protocol, the device comprising:
   a processor, and a memory device accessible by the processor, the processor operable to receive data from a second device on the network;
   a data configurator, the data configurator operable to dynamically reconfigure the data from the second device, the data from the second device being in the form of a network item defined by the second device, and the data configurator operable to transmit the reconfigured data to at least one of the processor and the memory device in the form of a device item that is native to the device; and
   a map record, the map record used by the data configurator and defining a unique relationship between the network item and the device item, the map record including a network representation portion for data in the network item and a device representation portion for data in the device item.

2. The device according to claim 1, further including a data design tool, the data design tool operable to generate configuration information for the map record including the network representation portion and the device representation portion.

3. The device according to claim 1, wherein the data configurator dynamically reconfigures the data from the second device using at least one of a data mapping configuration mode, a data type translation configuration mode, and a logical data manipulation configuration mode.

4. The device according to claim 1, wherein the map record includes an options portion.

5. The device according to claim 1, wherein the network representation portion and the device representation portion each include at least one of an ID data field, an offset data field, a size data field, and a type data field.

6. The device according to claim 1, wherein the data configurator is stored in the memory device.

7. The device according to claim 1, wherein the device comprises an imaging device.

8. The device according to claim 1, wherein the processor is operable to generate device data for communication to the second device on the network.

9. The device according to claim 8, wherein the data configurator is further operable to dynamically reconfigure the device data into a network item defined by the device, the device data being in the form of a vendor predefined data item, and the data configurator operable to pass the network item to the communication protocol for transmitting to the second device.

10. The device according to claim 1, wherein a plurality of map records are organized into a map list.

11. The device according to claim 10, wherein the map list comprises a hierarchical tree, the hierarchical tree including a flat tree and tree of sub-lists.

* * * * *